UNITED STATES PATENT OFFICE.

JACOB J. STORER, OF BOSTON, MASSACHUSETTS.

IMPROVEMENT IN FERTILIZERS FROM OFFAL.

Specification forming part of Letters Patent No. 143,310, dated September 30, 1873; application filed August 28, 1873.

*To all whom it may concern:*

Be it known that I, JACOB J. STORER, of Boston, in the county of Suffolk and State of Massachusetts, have discovered and manufactured a new and useful Fertilizer, made by putting blood, tank-stuff, or other refuse animal matter, separately or together, or in any combinations, into a revolving or stationary cylinder or furnace, and causing the flame, hot air, and the products of combustion, or either of them, from ordinary fires, or from burning pulverized fuel to pass into and through the furnace or cylinder, but in no instance upon the exterior thereof, and directly over or in contact with the said blood, tank-stuff, or other refuse animal matter.

I do not propose here to describe or claim any special apparatus which may be employed for effecting this result, as such apparatus has been secured to me by United States Patents No. 131,131, dated September 3, 1872, No. 132,498, dated October 22, 1872, No. 135,383, dated January 28, 1873, No. 136,943, dated March 18, 1873; nor do I claim a fertilizer manufactured by drying animal matter in cylinders or furnaces by the direct application of heated air simply, or in cylinders by the application of heat to the exterior thereof.

In the several patents named above I have described suitable apparatus and methods of preparing fertilizers from blood, offal, tank-stuff, scrap, and the like. By means of these apparatus and processes I have produced entirely new kinds of fertilizers readily distinguished in the market from such as are made by any of the drying and evaporating apparatus as used prior to my said inventions. In these the moisture was simply removed by evaporation from heat outwardly applied, or by passing steam, air, and gases through or over the material; but from the nature of the treatment the manufacture of most of such fertilizers has been condemned as nuisances, since the offensive gases given off during the process taint the air in the neighborhood.

By my processes and apparatus all the gases are decomposed and made inoffensive, and the material produced is rendered non-putrescent under ordinary climatic conditions by the effect of the flame, and by mingling with the mass free carbon in a fine state of division evenly distributed through it, and also by thoroughly charging it with the preservative properties of the smoke passing through the cylinder. This treatment gives my fertilizer a dark-brown color, while those made by the usual method are of a light-brown or yellow color, and are not free from matters ready and liable to ferment.

Having thus described my invention, what I claim, and desire to secure by Letters Patent of the United States, is—

The improved fertilizer herein described, consisting of offal, tank-stuff, blood, or other animal matters, separately or in combination, treated with burning gases directly in contact, so as to impregnate the mass with soot and free carbon, and give a dark-brown or almost black color to the product, substantially as described.

JACOB J. STORER.

Witnesses:
 CHARLES M. NICKERSON,
 G. H. McCLARE.